United States Patent [19]

Peters

[11] 4,250,018
[45] Feb. 10, 1981

[54] MULTIPLE STAGE HYDROCARBON CONVERSION PROCESS

[75] Inventor: Kenneth D. Peters, Elmhurst, Ill.

[73] Assignee: UOP Inc., Des Plaines, Ill.

[21] Appl. No.: 73,168

[22] Filed: Sep. 6, 1979

[51] Int. Cl.³ .................... C10G 35/2; C10G 65/02
[52] U.S. Cl. .................................. 208/49; 208/165; 208/169
[58] Field of Search .................. 208/49, 64, 65, 165, 208/169

[56] References Cited

U.S. PATENT DOCUMENTS

| | | | |
|---|---|---|---|
| 2,374,109 | 4/1945 | Layng et al. | 208/97 |
| 4,104,149 | 8/1978 | Veinerman et al. | 208/169 |
| 4,110,197 | 8/1978 | Herning et al. | 208/169 |
| 4,119,526 | 10/1978 | Peters et al. | 208/165 |

Primary Examiner—Herbert Levine
Attorney, Agent, or Firm—James R. Hoatson, Jr.; Robert W. Welch; William H. Page, II

[57] ABSTRACT

A multiple stage hydrocarbon conversion system wherein a hydrogen-hydrocarbonaceous feedstock reaction mixture is processed serially through a plurality of reaction zones, each of which contains a particulate catalyst disposed as an annular-form bed movable downwardly through the reaction zone, and wherein said reaction mixture is processed in radial flow through said annular-form bed. Pinning of the catalyst particles within the annular-form bed is substantially obviated by the combined effect of charging only a portion of the total hydrogen to the first reaction zone, charging the balance of the total hydrogen to a subsequent reaction zone, and restricting the effluent flow of at least one reaction zone.

9 Claims, 1 Drawing Figure

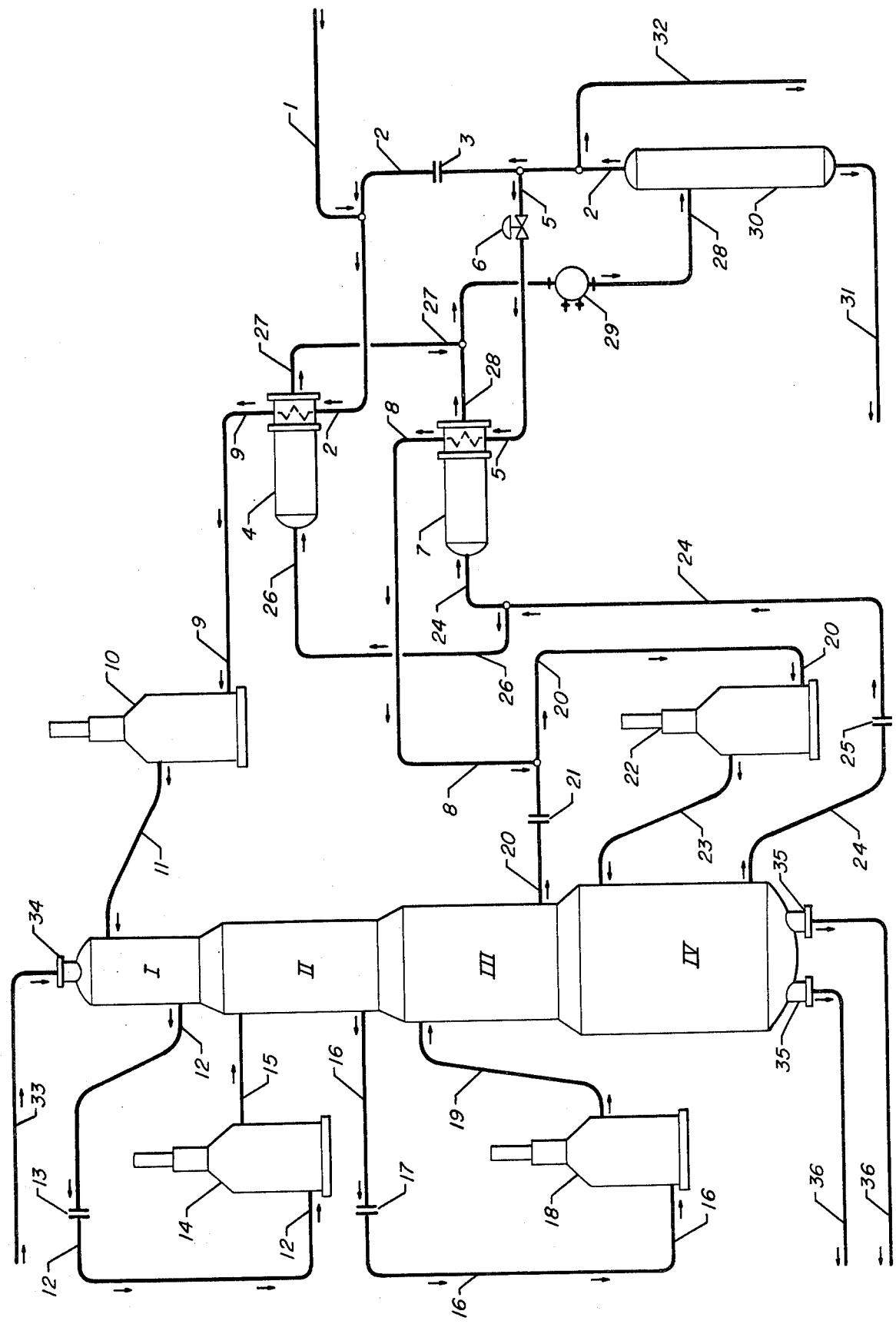

MULTIPLE STAGE HYDROCARBON CONVERSION PROCESS

This invention relates to a method for the catalytic conversion of a hydrocarbonaceous feedstock in a plurality of reaction zones of a multiple stage reaction system wherein a hydrogen-hydrocarbon reaction mixture is serially processed through said plurality of reaction zones in contact with a particulate catalyst gravitating downwardly through each of said reaction zones. The method is particularly adapted for use with a vapor phase hydrocarbon conversion process embracing hydrocarbon conversion reactions which are primarily endothermic reactions, and wherein the reaction mixture is processed downwardly and in essentially radial flow contact with the downwardly moving catalyst particles.

Multiple stage reaction systems, such as herein contemplated, have found extensive use in the petroleum and petrochemical industries for effecting a variety of hydrocarbon conversion reactions. Said reactions are either exothermic or endothermic and encompass both hydrogen-producing and hydrogen-consuming reactions. Multiple stage reaction systems usually take one of two forms. Thus, in an endothermic hydrocarbon conversion process, said system may comprise a side-by-side reactor configuration wherein a reactant stream is processed serially from the reaction zone of one reactor through the reaction zone of another reactor with intermediate heating of the reactant stream between reaction zones; or said system may comprise a stacked reactor design wherein a reactant stream is passed serially from a reaction zone of a topmost reactor to a reaction zone of a lowermost reactor, with intermediate heating of the reactant stream. Such systems have been utilized in the petroleum industry to effect numerous hydrocarbon conversion reactions including catalytic reforming, alkylation, dehydrogenation of ethylbenzene, and the like. The method of this invention is particularly useful with respect to an endothermic, vapor phase, hydrocarbon conversion process wherein catalyst particles are movable via gravity flow, and the multiple stage reaction system may comprise side-by-side reactors, stacked reactors, or a combination thereof.

Since catalyst particles movable through a reaction system by gravity flow are necessarily moving in a downward direction, the present method contemplates the withdrawal of catalyst particles from the bottom of one reaction zone and the introduction of said catalyst particles, fresh catalyst particles and/or regenerated catalyst particles to the top portion of a reaction zone next in sequence. The present method is intended to be applied to those reaction systems wherein the downwardly moving catalyst particles are disposed as an annular-form bed in a reaction zone, and the downward flow of the reactant stream is essentially radial flow with respect thereto.

A radial flow reaction system generally consists of tubular-form sections of varying nominal cross sectional areas, said sections being vertically and coaxially disposed to form the reaction vessel. Briefly, the system consists of an outer tubular reaction chamber containing a coaxially disposed tubular catalyst retaining screen with a nominal internal cross sectional area less than that of said chamber, and a tubular perforated centerpipe having a nominal internal cross sectional area which is less than that of said catalyst retaining screen. The vapor phase reactant stream is introduced into the outer annular space created by the chamber wall and the catalyst retaining screen, the latter forming an annular-form catalyst holding zone with the perforated centerpipe. The reactant stream flows laterally and radially from said outer annular space through the catalyst retaining zone into said centerpipe and out of the reaction chamber.

Illustrative of a multiple stage stacked reaction zone system, to which the present invention is particularly adaptable, is that shown in U.S. Pat. No. 3,706,536. Transfer of the gravity flowing catalyst particles from one reaction zone to another, as well as introduction of fresh catalyst particles and the withdrawal of spent catalyst particles, is effected through utilization of a plurality of catalyst transfer conduits. Experience in the use of such systems, as well as those where the reaction zones are disposed in a side-by-side relationship, indicates that the high vapor flow through the annular-form catalyst holding sections results in catalyst particles being pinned in the vicinity of the perforated centerpipe. Stagnant catalyst areas where the catalyst particles are prevented from assuming the gravity flow pattern are thereby created.

It is therefore an object of this invention to substantially alleviate the catalyst pinning problem in a multiple stage hydrocarbon conversion system wherein catalyst particles are movable via gravity flow. More specifically, it is an object of this invention to substantially alleviate said catalyst pinning problem in a multiple stage hydrocarbon conversion system comprising a plurality of reaction zones wherein catalyst particles are disposed in an annular-form bed in each of said reaction zones and said catalyst particles are movable downwardly through each of said zones via gravity flow.

Therefore, in a multiple stage hydrocarbonaceous feedstock conversion system wherein (1) a recycled hydrogen-rich vapor phase is admixed with said feedstock to provide a mixture having a hydrogen/hydrocarbon mole ratio of from about 0.5:1 to about 10:1, (2) said mixture is heated and processed serially through a plurality of reaction zones, (3) each reaction zone effluent is heated prior to introduction into the next succeeding reaction zone, and (4) catalyst particles are movable through an annular-form bed in each reaction zone via gravity flow, the present invention embodies a method for effecting the conversion of said feedstock which comprises the steps of: (a) initially introducing from about 40 to about 80 mole % of said hydrogen into the first reaction zone of said plurality of reaction zones by admixing only a sufficient portion of the hydrogen-rich vapor phase with said feedstock, heating, and introducing the heated mixture into said first reaction zone at hydrocarbon conversion conditions; (b) introducing the balance of said hydrogen into a subsequent reaction zone by admixing the remaining portion of said recycled hydrogen-rich vapor phase with the first reaction zone effluent, or with the effluent of an intermediate reaction zone, heating, and introducing the heated mixture into the next succeeding reaction zone at hydrocarbon conversion conditions; (c) restricting the effluent flow of at least one reaction zone by means of a fixed restriction orifice, and separating the last reaction zone effluent into a normally liquid product phase and a hydrogen-rich vapor phase; (d) recovering at least a portion of said hydrogen-rich vapor phase, and recycling said portion to the first reaction zone in accordance with step (a); (e) recovering another portion of said hydrogen-rich vapor phase for recycle to the next succeeding reaction zone in accordance with step (b); (f) at least periodically withdrawing catalyst from the last of said reaction zones; and, (g) at least periodically introducing fresh or regenerated catalyst into the first of said reaction zones.

The above embodiment is further characterized in that at least a major portion of the last reaction zone effluent is passed in heat exchange relationship with said hydrogen and hydrocarbonaceous feedstock mixture prior to the heating and introduction of said mixture into the first reaction zone in accordance with step (a), and still further characterized in that at least a minor portion of said last reaction zone effluent is passed in heat exchange relationship with said balance of said hydrogen prior to admixture with said first reaction zone effluent, or with the effluent of an intermediate reaction zone, in accordance with step (b).

One of the more specific embodiments of this invention relates to said multiple stage hydrocarbonaceous feedstock conversion system as applied to the catalytic reforming of a naphtha boiling range hydrocarbon feedstock, and comprises the steps of: (a) initially introducing from about 60 to about 70 mole % of said hydrogen into the first of four reaction zones by admixing a portion of the hydrogen-rich vapor phase with said feedstock, heating, and introducing the heated mixture into said first reaction zone at hydrocarbon conversion conditions; (b) introducing the balance of said hydrogen into the fourth reaction zone by admixing the remaining portion of said hydrogen-rich vapor phase with the third reaction zone effluent, heating, and introducing the heated mixture into said fourth reaction zone at hydrocarbon conversion conditions; (c) restricting the effluent flow from each of said reaction zones by means of a fixed restriction orifice, and separating the fourth reaction zone effluent into a normally liquid product phase and a hydrogen-rich vapor phase; (d) recovering at least a portion of said hydrogen-rich vapor phase for recycle to said first reaction zone in accordance with step (a) and restricting the flow of said hydrogen-rich vapor phase by means of a fixed restriction orifice; (e) recovering another portion of said hydrogen-rich vapor phase for recycle to said fourth reaction zone in accordance with step (b); (f) at least periodically withdrawing catalyst from the fourth reaction zone; and, (g) at least periodically introducing fresh or regenerated catalyst into said first reaction zone.

The foregoing embodiments are further characterized in that each of the aforesaid flow restrictions, including the recycled hydrogen-rich vapor phase flow restriction, effects an increase in the pressure drop across said plurality of reaction zones of from about 1 to about 10 psi.

Other objects and embodiments of this invention will become apparent in the following detailed specification.

U.S. Pat. No. 4,119,526 is illustrative of a multiple stage hydrocarbon conversion system comprising a plurality of reaction zones such as herein contemplated. The patented invention is directed to a solution of the catalyst pinning problem which is the focus of the present invention. As with the present invention, a hydrocarbonaceous feedstock and hydrogen mixture is processed serially through a plurality of reaction zones in each of which catalyst particles are movable downwardly via gravity flow. The catalyst pinning problem is dealt with by restricting the effluent of at least one reaction zone, and also the flow of the hydrogen-rich vapor phase separated from the last reaction zone effluent and recycled to the first reaction zone. The resulting increased density of the reaction zone feed, and the pressure drop within the entire reactor circuit serves to alleviate the catalyst pinning problem.

The method of the present invention is suitable for use in hydrocarbon conversion systems which are characterized as multiple stage, and in which catalyst particles are movable via gravity flow through each reaction zone. Furthermore, the present invention is principally intended for utilization in reactor systems where the principal reactions are endothermic and are effected in the vapor phase. Although the following discussion is specifically directed toward catalytic reforming of naphtha boiling range fractions, there is no intent to so limit the present invention. Catalytic reforming, as well as many other processes, has experienced several phases of development currently terminating in the system in which the catalyst beds assume the form of a descending column in one or more reaction vessels. Typically, the catalysts are utilized in substantially spherical form having a nominal diameter ranging from about 1/32-inch to about 5/32-inch in order to offer free-flow characteristics which will neither bridge, nor block the descending column, or columns or catalyst within the overall system.

In one such multiple stage system, the reaction chambers are vertically stacked, and a plurality, generally from about 6 to about 16, of relatively small diameter conduits, are employed to transfer catalyst particles from one reaction zone to the next lower reaction zone via gravity flow to be ultimately withdrawn from the last reaction zone. The latter are usually transported to the top of a catalyst regeneration facility also functioning with a descending column of catalyst particles. Regenerated catalyst particles are then transported to the top of the upper reaction zone of the stack. In order to facilitate and enhance gravity flow within each reaction vessel, as well as from one zone to another, it is particularly important that the catalyst particles have a relatively small nominal diameter, and one which is preferably less than about 5/32-inch. In a conversion system having the individual gravity flow reaction zones in side-by-side relationship, catalyst transport vessels of the type shown in U.S. Pat. No. 3,839,197 are employed in transferring the particles from the bottom of one zone to the top of the succeeding zone, and from the last reaction zone to the top of the regeneration facility.

Catalytic reforming of naphtha boiling range hydrocarbons, a vapor phase operation, is effected at hydrocarbon conversion conditions including catalyst bed temperatures in the range of about 700° to about 1020° F. Judicious and cautious techniques generally dictate that catalyst temperatures not substantially exceed a level of about 1020° F. Other conditions include a pressure of from about 50 to about 1000 psig, a liquid hourly space velocity (defined as volumes of fresh charge stock per hour, per volume of total catalyst particles) in the range of about 0.2 to about 10 and a hydrogen to hydrocarbon mole ratio generally in the range of about 0.5:1 to 10:1. As those skilled in the petroleum refining arts are aware, the described continuous regenerative reforming system offers numerous advantages when compared to the prior art fixed-bed systems. Among these is the capability of efficient operation at comparatively lower pressures—e.g. 50 to about 200 psig—and higher liquid hourly space velocities—e.g. about 3:1 to about 8:1. As a result of continuous catalyst regeneration, higher consistent inlet catalyst bed temperatures can be maintained—e.g. 950° to about 1010° F. Furthermore, there is afforded a corresponding increase in both hydrogen production and hydrogen purity in the recycled vaporous phase from the product separation facility.

Catalytic reforming reactions are varied, and include dehydrogenation of naphthenes to aromatics, dehydrocyclization of paraffins to aromatics, hydrocracking of long chain paraffins into lower boiling, normally liquid materials and, to a certain extent, the isomerization of paraffins. These reactions, the net result of which is endothermicity with respect to the overall reaction system, are effected through the utilization of one or more Group VIII noble metals (e.g. platinum, iridium, rhodium, palladium) combined with a halogen (e.g. chlorine and/or flourine) and a porous carrier material such as alumina. Relatively recent investigations have indicated that more advantageous results are attainable and enjoyed through the cojoint use of a catalytic modifier; these have been selected from the group of cobalt, nickel, gallium, germanium, tin, rhenium, vanadium and mixtures thereof, etc. Regardless of the selected catalytic composite, the ability to attain the advantage over the common fixed bed systems is greatly dependent upon achieving acceptable catalyst particle flow downwardly through the system. Not only must this be substantially uniform throughout the cross section of the annular catalyst bed, but stagnant areas of catalyst must be maintained at the most achievable minimum.

Catalytic reforming is a well known process which has been thoroughly described in the literature, having been a commercially important tool of the petroleum refining industry for about three decades. One of the many things gleaned from the vast amount of catalytic reforming experience and resulting knowledge, is the soundness of utilizing multiple stages, each of which contains a different quantity of catalyst, generally expressed as volume percent. The reactant stream, hydrogen and the hydrocarbon feed, flow serially through the reaction zones in order of increasing catalyst volume with, of course, interstage heating. In a three-reaction zone system, typical catalyst loadings are: first, 10% to about 30%, second, from about 20% to about 40%; and, third, from about 40% to about 60%. With respect to a four-reaction zone system, suitable catalyst loadings would be: first, 5% to about 15%; second, 15% to about 25%; third, 25% to about 35%; and, fourth, 35% to about 50%. Unequal catalyst distribution, increasing in the serial direction of reactant stream flow, facilitates and enhances the distribution of the reactions as well as the overall heating of reaction.

As heretofore stated, pinning of the catalyst particles to the perforated centerpipe stems primarily from the high velocity, lateral vapor flow across the annular-form catalyst holding zone, the pinning effect being more evident as the length and cross sectional area of said holding zone is decreased. In a multiple stage catalytic reforming system, the effect is therefore most pronounced in the first reaction zone with its shorter length and smaller cross sectional area catalyst holding zone. The effect is somewhat less pronounced in the intermediate reaction zones, and of relatively little consequence in the last reaction zone due to the increased length and larger cross sectional area of its annular form catalyst holding zone. Restricting the effluent flow from the last reaction zone effects a substantial improvement in the catalyst pinning problem. Preferably, the effluent flow from all reaction zones is restricted prior to introduction into the next succeeding reaction zone, or, with respect to the last reaction zone, prior to separation of the effluent flow into the normally liquid product and hydrogen-rich vapor phase. With respect to the intermediate reaction zones of a four reaction zone system, it is preferred to restrict the effluent flow of said intermediate zones in addition to that of the last reaction zone, with or without restriction of the first reaction zone effluent flow.

Restriction of the various reaction zone effluent streams can be effected in any suitable manner which produces or results in an additional overall pressure drop across the plurality of reaction zones of from about 1 to about 10 psi for each restriction. Similarly, it is intended that the flow restriction of the recycled hydrogen-rich vapor phase produce an additional pressure drop of from about 1 to about 10 psi. The flow restriction may be effected through the use of a venturi tube, orifice plate, etc., the orifice plate being particularly preferred for the vapor phase operation herein contemplated.

The catalyst pinning problem is further alleviated by the device of diverting a portion of the hydrogen-rich vapor phase normally recycled to the first reaction zone, and recycling said diverted portion to a subsequent reaction zone whereby the flow rate of the vapor phase reaction mixture across the annular-form catalyst holding zone is reduced. While the hydrogen-rich vapor phase diverted around the first reaction zone is advantageously recycled to any of the subsequent reaction zones, it is a preferred practice to recycle the diverted material to the last reaction zone to alleviate the coking tendency of said zone wherein catalyst coking is most pronounced. As heretofore mentioned, the hydrogen/hydrocarbon mole ratio of the hydrogen-hydrocarbonaceous feedstock mixture charged to the first reaction zone is generally in the range of from about 0.5:1 to about 10:1. More often, a hydrogen/hydrocarbon mole ratio of from about 3:1 to about 6:1 is preferred—particularly in a multiple stage catalytic reforming system. In any case, from about 40 to about 80 mole percent of said hydrogen is admixed with the hydrocarbonaceous feedstock charged to the first reaction zone, the balance being charged to a subsequent reaction zone—preferably the last reaction zone. More preferably, from about 60 to about 70 mole percent of said hydrogen is admixed with the hydrocarbonaceous feedstock and charged to the first reaction zone.

Catalyst pinning is in large part a function of two dependent variables: (1) the vapor mass flow rate, and (2) the density of the vapors which flow through the annular-form catalyst bed into and through the perforated centerpipe. To reduce or eliminate catalyst pinning, for a given design flow of fresh feedstock, the rate at which the hydrogen-rich vapor phase is recycled to the system must be reduced. This will, however, reduce the total mass flow to a given reaction zone, and this in turn reduces the reactor system pressure drop. Of course, the effective pressure in the initial reactor, in which catalyst pinning is most prevalent and troublesome, is reduced, and a corresponding reduction in vapor density ensues.

In bypassing the initial reaction zone and diverting a portion of the hydrogen-rich recycle gas to a subsequent reaction zone is series therewith as herein contemplated, the pressure drop across the plurality of reaction zones is increased, and the reaction zone or zones preceding said subsequent reaction zone experience a pressure increase and a corresponding increase in vapor density to substantially alleviate the catalyst pinning problem therein. The catalyst pinning problem is further alleviated by the device of restricting one or more of the various reaction zone effluent streams pursuant to the present invention. The use of the restriction orifices is a contributing factor to an increased pressure in the initial reaction zone, a corresponding increase in the vapor density therein, and a corresponding increase in the pressure drop across the plurality of reaction zones. Use of the restriction orifices also affords a greater recycle gas flow conducive to a reduced deposition of carbonaceous matter on the catalyst particles and a reduced load on the regeneration facility. In this respect, recycling of the diverted hydrogen-rich recycle gas through the last intermediate charge heater to the lowermost reaction zone helps to alleviate the coking tendency of said reaction zone wherein the bulk of the catalyst coking typically occurs.

Preferably, the restriction orifices are placed upstream of the intermediate reaction zone heaters to decrease the heater operating pressure and increase the velocity of the reaction zone effluent in the heater tubes. Similarly, it is a common practice to heat exchange the hydrogen-hydrocarbon reaction mixture against the hot last reaction zone effluent prior to introduction of the mixture into the first reaction zone. In accordance with the preferred mode of effecting the present invention, the hydrogen-rich recycle gas is restricted prior to the heat exchanger. While the restriction of said recycle gas does not necessarily contribute to the solution of the catalyst pinning problem, at least to as great an extent as the reaction zone effluent restriction, it does serve to insure a proper distribution of the hydrogen-rich recycle gas to the heat exchanger which generally consists of two parallel shells of exchange. In effect, the restriction orifices reinstate the pressure drop lost while operating at the lower and more desirable hydrogen/hydrocarbon mole ratios and lower reaction zone pressures.

In further description of the present invention, reference is made to the accompanying drawing. It is understood that the drawing is presented solely for purpose of illustration, and the same is not intended as a limitation on the generally broad scope of the invention as set out in the appended claims. Therefore, miscellaneous appurtenances well within the purview of those skilled in the art and not required for a complete understanding of the invention, have been eliminated or reduced in number. The illustrated embodiment is presented as a simplified schematic flow diagram showing a four-reactor or reaction zone catalytic reforming system having an uppermost or first reaction zone I, two intermediate reaction zones II and III, and a lowermost or fourth reaction zone IV.

The drawing illustrates a particularly preferred embodiment in which the effluent from each reaction zone is restricted, in addition to the restriction of the flow of the hydrogen-rich vapor phase recycled to the first reaction zone. With respect to the four reaction zones, this is accomplished through the use of restriction orifices 13, 17, 21 and 25. The flow of the hydrogen-rich vapor phase recycled to the first reaction zone is restricted by means of restriction orifice 3.

Referring then to the drawing, a stacked, gravity flow, catalytic reaction system is shown as having four individual reaction zones which are sized as to length and annular catalyst cross sectional area such that the distribution of the total catalyst volume is 10% in zone I, 15% in zone II, 25% in zone III, and 50% in zone IV. In a normal, substantially problem-free operation, fresh or regenerated catalyst particles are introduced through conduit 33 and inlet port 34 into the uppermost reaction zone I, and said particles gravitate downwardly into reaction zone II, from reaction zone II to reaction zone III, and from reaction zone III to reaction zone IV, said particles being ultimately withdrawn from the reactor system through a plurality of outlet ports 35 and conduits 36. Catalyst particles thus recovered may be transported to a continuous regeneration zone, not shown, or may be stored until a sufficient quantity is available for a batch type regeneration. The rate of catalyst flow through the reactor system, or the period of time required for catalyst particles to be introduced into the system, traverse the four reaction zones, and be withdrawn for regeneration, is determined by the rate at which the latter is effected. By monitoring various operating parameters while the system is in continuous operation, the catalyst withdrawal rate, or regeneration load, can be controlled.

A naphtha boiling range hydrocarbon feedstock is admitted to the process by way of line 1 and admixed with a hydrogen-rich vapor phase being recycled through line 2 from a separator 30, said hydrogen-rich vapor phase being recycled through a restriction orifice 3 rated at about 6 psi and contained in line 2. The hydrocarbon feedstock is admixed with said hydrogen-rich vapor phase to provide a reaction mixture having a hydrogen/hydrocarbon mole ratio of about 3:1, and said mixture is continued through line 2 to a heat exchanger 4 wherein the mixture is preheated by indirect heat exchange with the bulk of the hot reaction mixture effluent recovered from the lowermost reaction zone IV through line 24 and transferred to the heat exchanger 4 via line 26.

A second portion of said hydrogen-rich vapor phase being recycled from said separator 30, is diverted from line 2 at a point upstream of said restriction orifice 3 and transferred through line 5 and a flow control valve 6 to a second heat exchanger 7 wherein the diverted hydrogen-rich vapor phase is preheated in indirect heat exchange with a portion of said hot reaction mixture effluent recovered from the lowermost reaction zone IV via line 24. This last mentioned preheated hydrogen-rich vapor phase is recovered from the heat exchanger 7 through line 8 and recycled to the lowermost reaction zone IV as hereinafter described.

The hydrogen-hydrocarbon reaction mixture preheated in heat exchanger 4 exits through line 9 and enters a charge heater 10 wherein the mixture is heated to provide a desired inlet temperature to the annular-form catalyst bed disposed in the uppermost reaction zone I. The resulting vapor phase reaction mixture is recovered from the charge heater 10 and charged to said reaction zone I through line 11. The reaction mixture is processed downwardly through said uppermost reaction zone I, and the effluent from said reaction zone is recovered through line 12 containing a restriction orifice 13 rated at about 5 psi. Said effluent is continued through line 12 to a first intermediate charge heater 14. The effluent stream is thus reheated to provide a desired inlet temperature to the next annular-form catalyst bed disposed in the first intermediate reaction zone II, the reheated effluent stream being charged to said reaction zone by way of line 15. The hydrogen-hydrocarbon reaction mixture is continued downwardly through reaction zone II, and the reaction zone effluent is recovered through a restriction orifice 17 in line 16, reheated in a second intermediate charge heater 18, and charged to a second intermediate reaction zone III through line 19 to provide a desired inlet temperature to the annular-form catalyst bed disposed therein. The last mentioned restriction orifice is rated at about 6 psi.

The reaction zone III effluent stream is withdrawn through line 20 containing a restriction orifice 21 rated at about 6 psi and located upstream of the juncture of line 8 with line 20. At said juncture, the aforementioned preheated hydrogen-rich vapor phase recycled through line 8 is admixed with the reaction zone III effluent stream passing through line 20 to provide a reaction mixture therein having a hydrogen/hydrocarbon mole ratio of about 4.5:1. This hydrogen-enriched reaction mixture is continued through line 20 to a third and last intermediate charge heater 22 wherein the mixture is reheated to provide a desired inlet temperature to the annular-form catalyst bed disposed in the lowermost reaction zone IV. The reheated mixture is transferred from the last mentioned heater to said reaction zone IV by way of line 23.

The hot reaction mixture effluent stream from the lowermost reaction zone IV is recovered through line 24 and a restriction orifice 25 rated at about 6 psi. The hot effluent stream is continued through line 24 and utilized as a heat exchange medium in the heat exchangers 4 and 7. A major portion of the hot effluent stream is diverted from line 24 through line 26 to heat exchanger 4, while a minor portion continues through line 24 to heat exchanger 7. The reaction mixture thus cooled is recovered from heat exchanger 4 through line 27, and from heat exchanger 7 through line 28, the heat exchanger effluent streams being combined in line 28 and passed through a condenser 29 wherein further cooling and condensation is effected at a temperature of from about 60° to about 140° F. The mixture is continued through line 28 to a separator 30. A hydrogen-rich vapor phase is withdrawn from the separator 30 through an overhead line 2, and excess hydrogen is recovered through line 32 at a rate determined by a pressure control means not shown. The balance of the hydrogen-rich vapor phase is continued through line 2, with one portion being diverted through line 5 at a point upstream of the restriction orifice 3 for recycle to the lowermost reaction zone IV, and the remaining being continued through line 2 and said restriction orifice 3 for recycle to the uppermost reaction zone I, all in accordance with the foregoing process description. A normally liquid product phase of the reaction mixture is recovered from the separator 30 through line 31 and treated in conventional fractionation facilities which are not shown.

To reiterate briefly, by diverting a portion of the hydrogen-rich recycle gas to the lowermost reaction zone, a portion which would normally be included in the hydrogen-rich recycle gas charged to the uppermost reaction zone, the flow rate of the vapor phase reaction mixture to and through the initial reaction zones is reduced, the initial reaction zones experience a pressure increase and a corresponding increase in vapor pressure, and the pressure drop across the plurality of reaction zones is increased. This desirable combination of effects is the further result of the restriction orifices in the effluent flow of the various reaction zones. The end result is that the tendency of the catalyst particles to become pinned in the initial reaction zones is substantially obviated. Further, by preheating and injecting the diverted hydrogen-rich recycle gas into the last intermediate charge heater, the load on said heater is appreciably reduced, and the improved thermal conductivity of the lowermost reaction zone effluent enhances the heat exchange capacity of the downstream heat exchangers. And still further, recycling of the diverted hydrogen-rich recycle gas through the last intermediate charge heater to the lowermost reaction zone helps to alleviate the coking tendency of said reaction zone wherein the bulk of the catalyst coking typically occurs.

I claim as my invention:

1. In a multiple stage hydrocarbonaceous feedstock conversion system wherein (1) a recycled hydrogen-rich vapor phase is admixed with said feedstock to provide a mixture having a hydrogen/hydrocarbon mole ratio of from about 0.5:1 to about 10:1, (2) said mixture is heated and processed serially through a series of four reaction zones, (3) each reaction zone effluent is heated prior to introduction into the next succeeding reaction zone, and (4) catalyst particles are movable through an annular-form bed in each reaction zone via gravity flow, the method of effecting the conversion of said feedstock which comprises the steps of:
  (a) initially introducing from about 40 to about 80 mole % of said hydrogen into the first reaction zone of said series of reaction zones by admixing only a sufficient portion of the hydrogen-rich vapor phase with said feedstock, heating, and introducing the heated mixture into said first reaction zone at hydrocarbon conversion conditions;
  (b) introducing the balance of said hydrogen into the fourth reaction zone of said series by admixing the remaining portion of said recycled hydrogen-rich vapor phase with the effluent from the third reaction zone of the series, heating, and introducing the heated mixture into said fourth reaction zone at hydrocarbon conversion conditions;
  (c) restricting the effluent flow of at least one reaction zone by means of a fixed restriction orifice, and separating the fourth reaction zone effluent into a normally liquid product phase and a hydrogen-rich vapor phase;
  (d) recovering at least a portion of said hydrogen-rich vapor phase for recycle to said first reaction zone in accordance with step (a) and to said fourth reaction zone in accordance with step (b), each of the aforesaid flow restrictions effecting an increase in the pressure drop across said plurality of reaction zones of from about 1 to about 10 psi;
  (e) at least periodically withdrawing catalyst from the fourth said reaction zone; and,
  (f) at least periodically introducing fresh or regenerated catalyst into the first of said reaction zones.

2. The method of claim 1 further characterized in that the fourth reaction zone effluent is restricted prior to separation thereof into a normally liquid product phase and a hydrogen-rich vapor phase.

3. The method of claim 1 further characterized in that the effluent flow of an intermediate reaction zone is restricted prior to the introduction thereof into the next succeeding reaction zone, and the fourth reaction zone effluent is restricted prior to the separation thereof into a normally liquid product phase and a hydrogen-rich vapor phase.

4. The method of claim 1 further characterized in that the reaction zones of said series of reaction zones are disposed in side-by-side relationship and the catalyst particles ae transferred from the bottom of one reaction zone to the top of the next succeeding reaction zone.

5. The method of claim 1 further characterized in that the reaction zones of said series of reaction zones are stacked and share a common vertical axis, and the catalyst particles are transferred via gravity flow from one reaction zone to the next lower reaction zone in said stack.

6. The method of claim 1 further characterized with respect to step (a) in that from about 60 to about 70 mole % of said hydrogen is introduced into said first reaction zone.

7. The method of claim 1 further characterized in that at least a minor portion of said fourth reaction zone effluent is passed in heat exchange relationship with said balance of said hydrogen prior to admixture with said third reaction zone effluent in accordance with step (b).

8. The method of claim 1 further characterized in that at least a major portion of the fourth reaction zone effluent is passed in heat exchange relationship with said hydrogen and hydrocarbonaceous feedstock mixture prior to heating and introduction of said mixture into said first reaction zone in accordance with step (a).

9. The method of claim 1 further characterized with respect to step (d) in that the flow of said hydrogen-rich vapor phase recovered for recycle to said first reaction zone in accordance with step (a) is restricted by means of a fixed restriction orifice.

* * * * *